(12) United States Patent
Ballnik et al.

(10) Patent No.: US 8,948,946 B2
(45) Date of Patent: Feb. 3, 2015

(54) HYBRID THERMAL SYSTEM WITH DEVICE-SPECIFIC CONTROL LOGIC

(71) Applicant: GM Global Technology Operations LLC, Detroit, MI (US)

(72) Inventors: Christopher D S Ballnik, Milford, MI (US); Xiaowen Luo, Canton, MI (US); Keith D. Buford, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 98 days.

(21) Appl. No.: 13/688,297

(22) Filed: Nov. 29, 2012

(65) Prior Publication Data

US 2014/0148982 A1    May 29, 2014

(51) Int. Cl.
*B60L 11/00* (2006.01)
*B60L 9/00* (2006.01)
*G05D 1/00* (2006.01)
*G06F 7/00* (2006.01)
*F01P 7/00* (2006.01)
*F28F 27/00* (2006.01)

(52) U.S. Cl.
CPC *F28F 27/00* (2013.01); *B60L 11/00* (2013.01)
USPC ............ 701/22; 701/1; 701/36; 701/33.1; 123/41.02; 123/41.12; 123/41.11

(58) Field of Classification Search
CPC ............ F01P 3/20; F01P 3/00; F01P 5/10; F01P 1/06; F01P 7/16; F01P 5/14; F01P 7/02; F01P 7/14; F01P 11/08; F28F 27/00; F28F 27/02; B60W 2510/0676; B60W 10/30; B60W 10/08; B60W 10/00; Y02T 70/5218; Y02T 10/26; Y02T 10/48; Y02T 50/676
USPC ............ 701/22, 32.9, 112, 3, 113, 54, 36, 51; 123/41.02, 41.29, 445, 446, 486, 562, 123/563
See application file for complete search history.

(56) References Cited

U.S. PATENT DOCUMENTS

| | | | |
|---|---|---|---|
| 7,121,234 B2* | 10/2006 | Schmitz et al. | 123/41.02 |
| 7,481,072 B2* | 1/2009 | Ostrom et al. | 62/243 |
| 2003/0196612 A1* | 10/2003 | Le Lievre et al. | 123/41.1 |
| 2003/0196613 A1* | 10/2003 | Tomasseli et al. | 123/41.31 |
| 2006/0106524 A1* | 5/2006 | Schmitz et al. | 701/112 |
| 2006/0289663 A1* | 12/2006 | Smith | 237/12.3 B |
| 2007/0209610 A1* | 9/2007 | Bradley et al. | 123/41.29 |
| 2008/0066476 A1* | 3/2008 | Zhu et al. | 62/133 |
| 2008/0308049 A1* | 12/2008 | Komurian et al. | 123/41.08 |

(Continued)

*Primary Examiner* — Calvin Cheung
*Assistant Examiner* — Luis A Martinez Borrero
(74) *Attorney, Agent, or Firm* — Quinn Law Group, PLLC

(57) ABSTRACT

A thermal system includes fluid-cooled devices, a controller, and a thermal loop or loops each having a cooling actuator and fluid passages. The controller executes device-specific control logic to arbitrate between cooling requests having different relative priorities. The controller receives raw speed requests and noise, vibration, and harshness (NVH) limits for each device, and processes the raw speed requests and NVH limits to determine a relative cooling priority for each device. The controller outputs a speed command to the actuator(s) for each thermal loop in order to cool the devices at a level required by the device having the highest relative cooling priority. A vehicle includes a traction motor, a transmission that is selectively connected to the traction motor, fluid-cooled devices each in electrical communication with the motor, and a controller configured to execute the arbitration method noted above.

20 Claims, 3 Drawing Sheets

(56) References Cited

U.S. PATENT DOCUMENTS

| | | |
|---|---|---|
| 2009/0032229 A1* | 2/2009 | Gallegos-Lopez et al. ............. 165/104.33 |
| 2009/0139781 A1* | 6/2009 | Straubel .................. 180/65.1 |
| 2010/0065355 A1* | 3/2010 | Reddy .................... 180/65.31 |
| 2010/0095909 A1* | 4/2010 | Lin et al. ................. 123/41.02 |
| 2010/0139582 A1* | 6/2010 | Bilezikjian et al. ......... 123/41.02 |
| 2011/0016899 A1* | 1/2011 | Ogura ..................... 62/239 |
| 2011/0106358 A1* | 5/2011 | Sawada et al. ............. 701/22 |
| 2011/0214627 A1* | 9/2011 | Nishikawa et al. ......... 123/41.02 |
| 2012/0082871 A1 | 4/2012 | Simonini et al. |
| 2012/0102995 A1* | 5/2012 | Sakata .................... 62/238.1 |
| 2012/0103283 A1* | 5/2012 | Mehring et al. ........... 123/41.02 |
| 2012/0118248 A1* | 5/2012 | Mehring et al. ........... 123/41.08 |
| 2012/0137993 A1* | 6/2012 | Kim et al. ................ 123/41.11 |
| 2012/0143414 A1* | 6/2012 | Shin et al. ................ 701/22 |
| 2012/0152186 A1* | 6/2012 | Sujan et al. .............. 123/41.09 |
| 2013/0094972 A1* | 4/2013 | Smith et al. .............. 417/32 |
| 2013/0255599 A1* | 10/2013 | Jentz et al. ............... 123/41.1 |
| 2013/0255603 A1* | 10/2013 | Pursifull et al. ........... 123/41.15 |
| 2013/0255604 A1* | 10/2013 | Rollinger et al. .......... 123/41.15 |
| 2013/0255605 A1* | 10/2013 | Jentz et al. ............... 123/41.15 |
| 2014/0114516 A1* | 4/2014 | Badger et al. ............. 701/22 |

* cited by examiner

HYBRID THERMAL SYSTEM WITH DEVICE-SPECIFIC CONTROL LOGIC

TECHNICAL FIELD

The present disclosure relates to a hybrid thermal system having device-specific control logic.

BACKGROUND

Hybrid powertrains use multiple sources of input torque as needed in order to optimize fuel economy. Typically, an internal combustion engine provides input torque at higher vehicle speeds, either alone or assisted by additional input torque from an electric traction motor. The engine may be turned off at idle to conserve fuel. The traction motor may be used at low speeds to propel the vehicle in an electric-only mode, with the engine automatically restarting above a threshold speed or a threshold output torque request. In mild hybrid configurations, the traction motor is not used to propel the vehicle, but is still used to crank and start the engine after an engine autostop event. Extended-range electric vehicles provide yet another powertrain design in which a small internal combustion engine is used to generate electricity for powering the traction motor and/or for recharging a high-voltage battery.

In all of the example hybrid powertrain types noted above, a hybrid thermal system is used to cool various devices. Such fluid-cooled devices may include, for example, power inverter modules, auxiliary power modules, energy storage systems, the traction motor(s), and the like. A typical hybrid thermal system uses multiple cooling actuators. For instance, a fluid pump and one or more fans or blowers may circulate cooling fluid through different thermal loops. Proper thermal management of the various fluid-cooled devices is essential to ensuring the optimal performance of the hybrid powertrain.

SUMMARY

A hybrid thermal system is disclosed herein. The thermal system cools a plurality of fluid-cooled devices via at least one thermal loop, and includes a controller. Each thermal loop has a dedicated cooling actuator, such as a fluid pump, fan, or blower, and a fluid passage connecting the cooling actuator to the devices cooled via that particular thermal loop. The controller executes recorded device-specific control logic to automatically arbitrate between multiple cooling requests from the various devices.

The controller receives, from each device, a corresponding raw speed request and a noise, vibration, and harshness (NVH) limit. The controller processes the received raw speed requests and NVH limits, a step which includes determining a relative cooling priority for each fluid-cooled device in each thermal loop. The controller then outputs a speed command to each of the cooling actuators from which cooling is required to thereby cool the devices in each thermal loop. Cooling in each thermal loop occurs at the level required by the device having the highest cooling priority relative to all other devices in that particular loop.

A method is also disclosed herein. The method includes circulating a cooling fluid through a fluid passage to one or more fluid-cooled device in each of a first and a second thermal loop via a first and second cooling actuator, respectively. The method further includes arbitrating, via a controller, different cooling requests from each of the devices. Arbitrating the cooling requests includes receiving, for each of the devices, a raw speed request and an NVH limit, and then processing the raw speed requests and NVH limits, including determining a relative cooling priority for each device. Additionally, the method includes transmitting a speed command to each of the first and second cooling actuators. Upon receipt of the speed commands, the actuators respond by cooling the devices in the first and second thermal loops at a level required by the device having the highest relative cooling priority in that particular thermal loop.

A vehicle includes an electric traction motor having an output member, a transmission having an input member that is selectively connected to the output member of the traction motor, a plurality of fluid-cooled devices each in electrical communication with the electric traction motor, a hybrid thermal system that cools the various devices, and a controller.

The thermal system of the example vehicle includes a first thermal loop having a pump that circulates coolant and conduit connecting the pump to any of the devices cooled via the first thermal loop. The conduit conducts the coolant to and from the fluid-cooled devices in the first thermal loop. The thermal system also includes a second thermal loop having, as a cooling actuator, a fan or blower that circulates air as a cooling medium, and air ducts connecting the fan/blower to any of the devices that are cooled via the second thermal loop. The air ducts conduct the air to and from the devices in the second thermal loop. The controller executes device-specific control logic from memory to automatically arbitrate between different cooling requests of the various fluid-cooled devices, for instance by using the method noted above.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
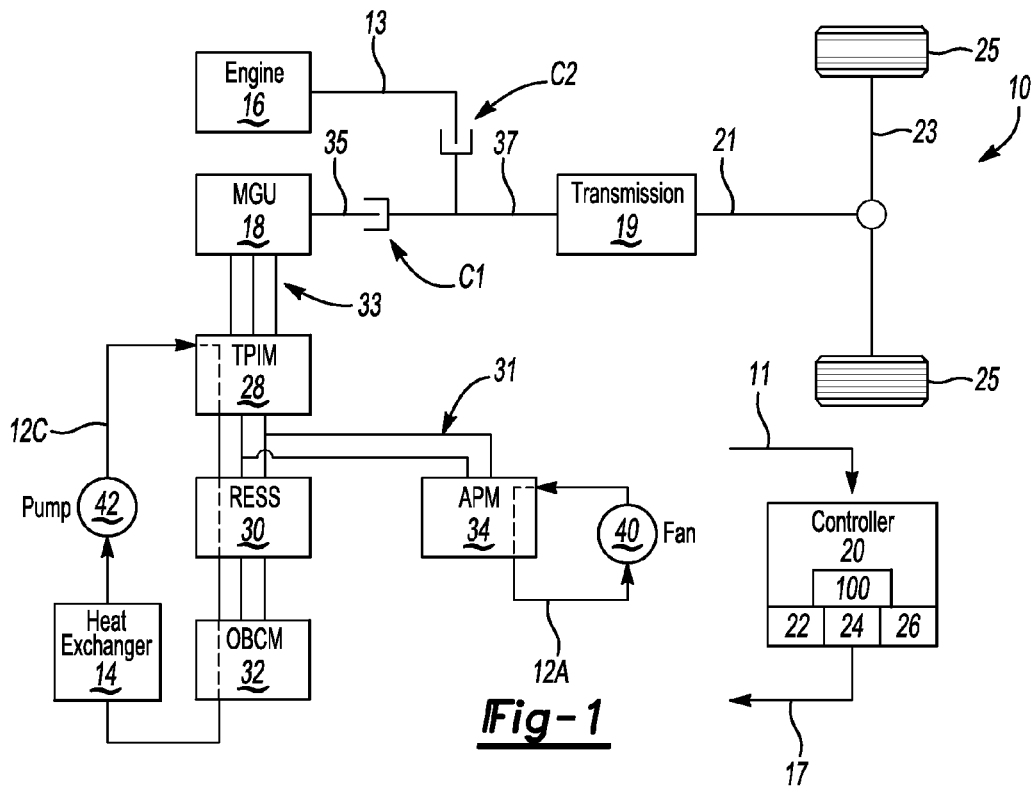
FIG. 1 is a schematic illustration of an example hybrid vehicle having a hybrid thermal system that is controlled as set forth herein.

Referring to the drawings, and beginning with FIG. 1, an example hybrid vehicle 10 includes a hybrid thermal system 50. The hybrid thermal system 50 includes respective first and second thermal loops 12A and 12C, which are used to cool various fluid-cooled devices of the vehicle 10 as needed. Some devices may be air cooled via the first thermal loop 12A, while other devices may be cooled using circulated coolant via the second thermal loop 12C, with the letters "A" and "C" representing "air" and "coolant" as the respective cooling fluids. In the first thermal loop 12A, a blower or fan 40 is used to circulate air as the cooling fluid. A fluid pump 42 positioned downstream of a heat exchanger 14 may circulate coolant in the second thermal loop 12C, e.g., a mixture of water and ethylene glycol or a suitable hydrofluorocarbon such as R-12, R-22, R-134A, etc. Thus, the fan 40 and pump 42 act herein as cooling actuators within the hybrid thermal system 50.

Active thermal management aboard the vehicle 10 is controlled via operation of an onboard controller 20, which ultimately transmits an output signal (arrow 17), including speed commands to the fan 40 and the pump 42 as described below with reference to FIG. 2. The controller 20 includes tangible, non-transitory memory 22 on which is recorded instructions or code embodying device-specific control logic 24. An example embodiment of the respective first and second thermal loops 12A, 12C is described below with reference to FIG. 2. Device-specific control logic 24, which is selectively executed by a processor 26 and any required hardware components of the controller 20, is described in further detail below with reference to FIG. 3. The device-specific control logic 24 uses calibrated noise, vibration, and harshness (NVH) limits of FIG. 4 to arbitrate between different cooling requests of the various fluid-cooled devices used in each of the first and second thermal loops 12A and 12C. An example arbitration method 100 is described in more detail below with reference to FIG. 5.

The vehicle 10 shown schematically in FIG. 1 may include an internal combustion engine 16, one or more electric traction motors 18, and a transmission 19. In the non-limiting example embodiment of FIG. 1, the vehicle 10 is configured as a conventional hybrid vehicle, i.e., the engine 16 and/or the electric traction motor 18 selectively deliver input torque to the transmission 19 as needed. In other embodiments, the engine 16 may be used solely to generate electricity, such as in the example of an extended-range electric vehicle. Alternatively, the engine 16 may be eliminated altogether such that the vehicle 10 is powered solely via torque from the traction motor(s) 18.

Regardless of the configuration, transmission output torque is ultimately delivered to an output member 21 of the transmission 19, and from there to the drive axle(s) 23 and a set of drive wheels 25. In some embodiments, the traction motor 18 may be selectively connected to and disconnected from the transmission 19 via a first input clutch C1. Similarly, the engine 16 may be selectively connected to and disconnected from the transmission 19 via a second input clutch C2. Actuation of the clutches C1 and C2, as well as other clutches within the transmission 19, may be controlled to establish various transmission gear states. Additional or fewer clutches may be used in other configurations without departing from the intended inventive scope.

The vehicle 10 may include multiple fluid-cooled devices each requiring liquid cooling via the first or the second thermal loops 12A or 12C, respectively, as noted above. In some embodiments, the devices may be in electrical communication with the electric traction motor 18. Example fluid-cooled devices include a traction power inverter module (TPIM) 28, a rechargeable energy storage system (RESS) 30, an on-board battery charging module (OBCM) 32, and an auxiliary power module (APM) 34, all of which are typical components of a hybrid powertrain.

The TPIM 28 may be electrically connected to the RESS 30 via a DC bus 31. Semiconductor switches (not shown) of the TPIM 28 are controlled via pulse width modulation or other power switching techniques to generate an AC output voltage, which is then transmitted via an AC bus 33 to the electric traction motor 18. A motor output shaft 35 of the traction motor 18, as well as an output shaft 13 of the engine 16 when the engine 16 is used as a torque input device, may be selectively connected to an input member 37 of the transmission 19.

As is well understood in the art, a battery charging module such as the OBCM 32 may be used to charge the RESS 30 when the vehicle 10 is not in use. For instance, the OBCM 32 may be plugged into a standard 110 VAC or 220 VAC wall outlet, with the OBCM 32 converting and filtering line power as needed to charge the RESS 30. The APM 34 may be used aboard the vehicle 10 as a DC-DC voltage converter in order to provide DC voltage at a required level, typically 12-15 VDC, i.e., a suitable auxiliary voltage.

The controller 20 of FIG. 1 may be embodied as a computer device or multiple networked devices having the tangible, non-transitory memory 22 and processor(s) 26. As noted above, the device-specific control logic 24 is recorded in the memory 22, e.g., optical, magnetic, and/or another physical storage medium that records and retains computer-executable code embodying the method 100. The processor 26 is coupled to the memory 22, and is configured to access the memory 22 to thereby execute the required steps of the method 100, including any of the broad steps outlined below with reference to FIG. 5.

In its role in thermal management aboard the vehicle 10, the controller 20 is configured to receive or derive a set of input signals (arrow 11) describing certain performance aspects of the various fluid-cooled devices of the vehicle 10. The controller 20 processes the input signals (arrow 11), and in doing so, generates the commanded speed (arrow 17) for each of the cooling actuators in the respective first and second thermal loops 12A, 12C, which are the fan 40 and the pump 42 for the example configuration of FIG. 1.

Figure 2:
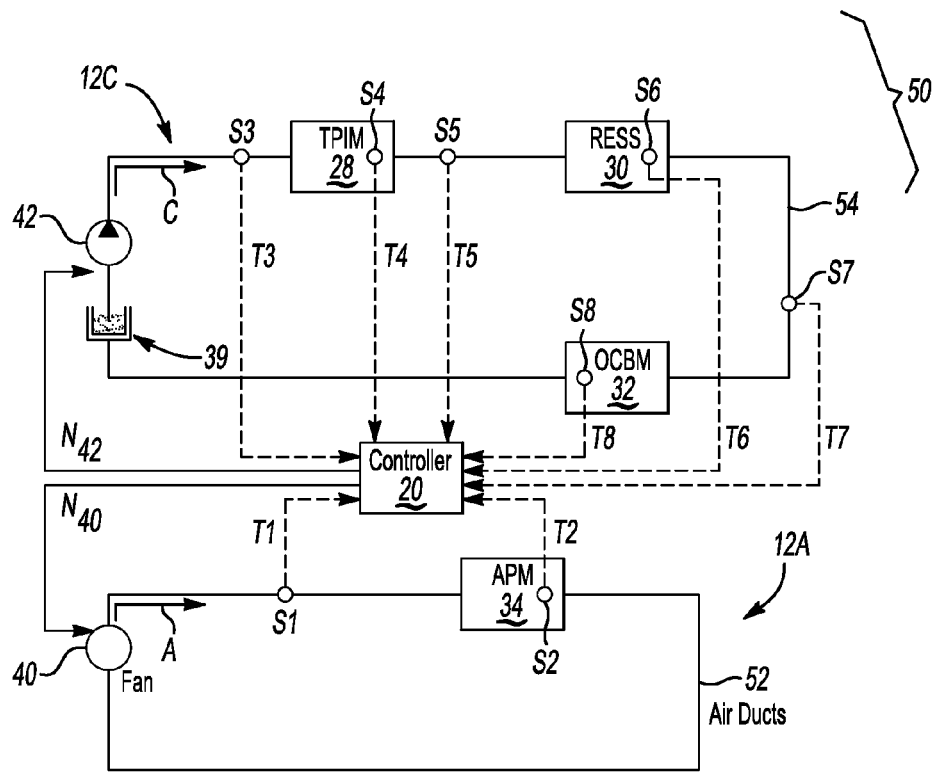
FIG. 2 is a schematic illustration of an example hybrid thermal system usable with the vehicle shown in FIG. 1.

Referring to FIG. 2, an example hybrid thermal system 50 usable with the vehicle 10 of FIG. 1 includes the controller 20, the first thermal loop 12A carrying an airflow (arrow A), and the second thermal loop 12C carrying a coolant flow (arrow C). The first thermal loop 12A includes air ducts 52 connecting the fan 40 with one or more air-cooled devices, e.g., the APM 34, such that the APM 34 is in fluid communication with the fan 40. In some configurations, a first temperature sensor S1 may be positioned with respect to an inlet of the APM 34 and configured to measure an inlet temperature of the airflow (arrow A) into the APM 34. The measured inlet temperature may be transmitted as a first temperature signal (arrow T1) to the controller 20. A second temperature sensor S2 may be positioned within the APM 34 itself. The second temperature sensor S2 may be configured to measure the internal temperature of the APM 34, i.e., of a surface or component of the APM 34 as opposed to the airflow (arrow A), and to transmit the measured internal temperature of the APM 34 to the controller 20 as a second temperature signal (arrow T2).

Likewise, in the second thermal loop 12C, coolant is drawn from a sump 39 and circulated via conduit 54. Each fluid-cooled device may include an inlet temperature sensor and/or an internal temperature sensor. For example, the TPIM 28 may include a third temperature sensor S3 and/or fourth temperature sensor S4, with the sensors S3 and S4 acting as an inlet and an internal temperature sensor, respectively. Inlet/internal sensor pairs S5, S6 and S7, S8 may be used in turn for the RESS 30 and the OBCM 32, respectively. Third and fourth temperature sensors S3 and S4 transmit the respective third and fourth temperature signals T3 and T4. Likewise, fifth and sixth temperature sensors S5 and S6 transmit respective fifth and sixth temperature signals T5 and T6, while the seventh and eighth temperature sensors S7 and S8 transmit respective seventh and eighth temperature signals T7 and T8.

While each fluid-cooled device is shown in FIG. 2 as having both an inlet and an internal temperature sensor, this is not necessarily the case. For various reasons, including component count/cost reduction, some temperature sensors may be omitted. In such embodiments, the controller 20 may still receive at least one of the inlet or internal temperatures from other temperature sensors that are retained, and may calculate or derive temperature values that are not otherwise available via direct measurement. For example, the controller 20 may use efficiency data and/or other operating information describing the performance of the various fluid-cooled devices to calculate or estimate the temperature of the cooling medium anywhere in the first or second thermal loops 12A or 12C, and/or an internal temperature of a given fluid-cooled device.

The controller 20 shown in FIG. 2 may, in some configurations, estimate the inlet temperature via modeling and/or by using any available temperature sensors. In the example shown in FIG. 2, for instance, if the temperature sensors S3 and S4 are available but the temperature sensor S5 is not, knowledge of the distance between the temperature sensors S3 and S5, known heat transfer characteristics of the coolant used in the thermal loop 12C, and the measured temperature from the available temperature sensor S4 may be used to estimate the inlet temperature that would otherwise be directly measured via the temperature sensor S5. Alternatively, a calibrated default maximum temperature may be recorded and used in the subsequent control, thereby assuming a worst case scenario. As explained below, in the control of the first and second thermal loops 12A and 12C, respectively, the controller 20 ultimately transmits a speed command (arrows $N_{40}$, $N_{42}$) to the fan 40 and the pump 42, respectively, or to whichever of these cooling actuators is needed at that time. The speed commands $N_{40}$, $N_{42}$ of FIG. 2 may be included as part of the output signals (arrow 17) noted above with reference to FIG. 1.

Figure 3:
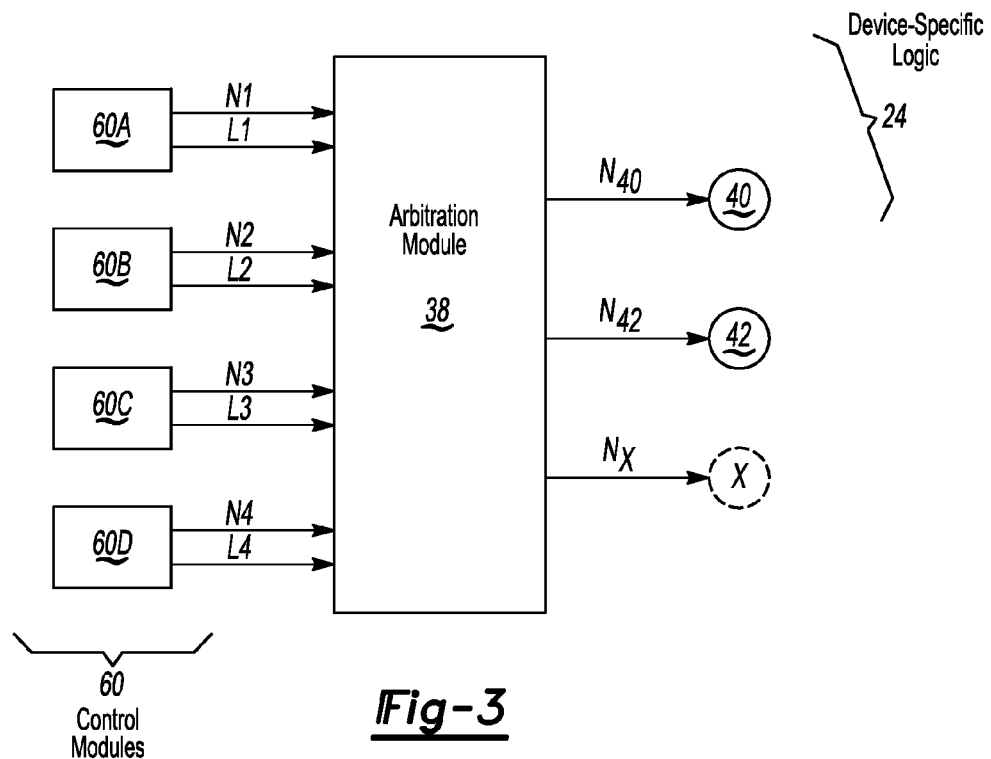
FIG. 3 is a schematic logic diagram describing device-specific modular control logic that may be used to control the hybrid thermal system of FIG. 2.

Referring to FIG. 3, the device-specific control logic 24 may be embodied as computer-executable code recorded in the memory 22 of FIG. 1. The control logic 24 is selectively executed via the processor 26 of the same Figure to automatically arbitrate between different cooling requests aboard the vehicle 10. The recorded control logic 24 may include multiple software control modules 60. Each fluid-cooled device has an associated software control module 60, which are represented in FIG. 3 as the example software control modules 60A, 60B, 60C, and 60D. For example, using the hybrid thermal system 50 shown in FIG. 2, the OBCM 32 may have an associated OBCM software control module 60A, while the TPIM 28 may have its own associated TPIM software control module 60B. Likewise, the APM 34 may have an associated APM software control module 60C, while the RESS 30 may have an associated RESS software control module 60D. More or fewer software control modules 60 may be used without departing from the intended inventive scope.

The device-specific control logic 24 also includes an arbitration module 38. The arbitration module 38, which may be embodied as recorded instructions in the memory 22 of FIG. 1 and executed via the processor 26 using any other required hardware, receives, as a set of inputs, two input signals from each of the software control modules 60A-D. The first input signal is the raw speed request of an associated fluid-cooled device, which is represented in FIG. 3 as N1-N4 for the software control modules 60A-D, respectively. The second input signal is the fluid-cooled device's temperature and speed-dependent NVH curve limit, which are represented in FIG. 3 as L1-L4 for the respective software control modules 60A-D. The raw speed requests (N1-N4) may be a percentage of a calibrated maximum speed for the particular cooling actuator, e.g., the fan 40 or the pump 42 of FIG. 1. The NVH curve limits L1-L4 are ultimately used to assign or determine a relative priority for each fluid-cooled device, as will now be explained with reference to FIG. 4.

Figure 4:
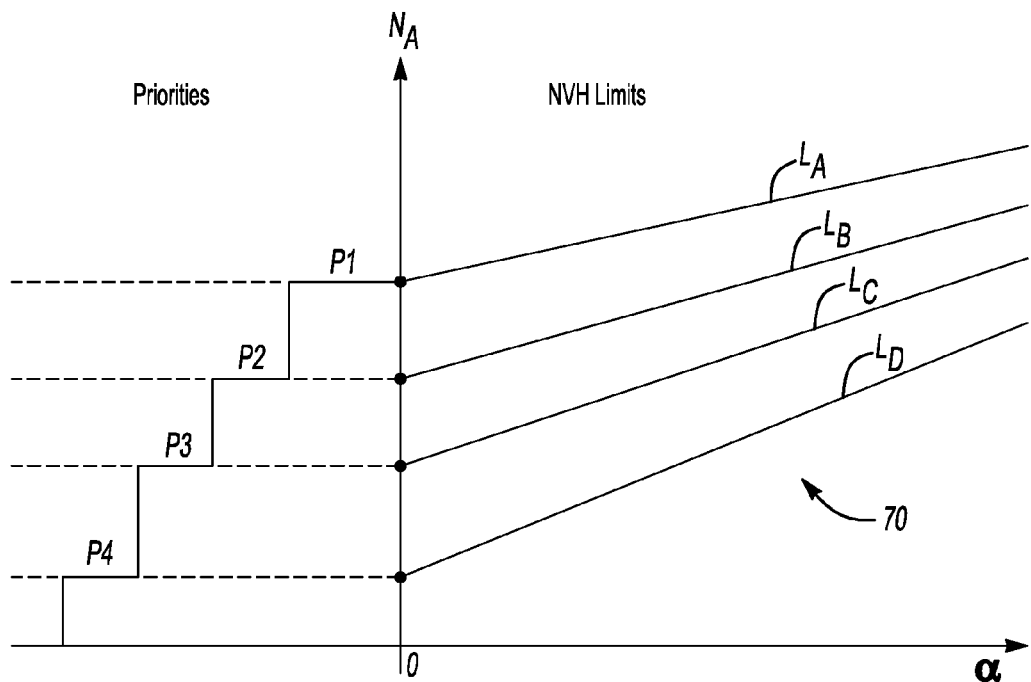
FIG. 4 is a set of curves describing example noise, vibration, and harshness limits of an example cooling actuator usable within the hybrid thermal system shown in FIG. 2.

Referring to FIG. 4, example NVH curve limits are represented as traces 70, which are indexed on the horizontal axis as a reference speed ($\alpha$), e.g., vehicle speed, engine speed, etc., and on the vertical axis as an actuator speed ($N_A$). On the left side of the vertical axis, relative priorities (P1, P2, P3, P4) are projected for each of the traces 70, with P1 being the highest priority and P4 the lowest priority. In the simplified embodiment of FIG. 4, four NVH traces $L_A$, $L_B$, $L_C$, and $L_D$ are shown for a given fluid-cooled device, e.g., the TPIM 28, for four different temperatures. Each trace $L_{A-D}$ may have a different relative priority (P1-P4) depending on the reference speed ($\alpha$).

For instance, at a lower temperature, a given fluid-cooled device may have a priority of P4, as represented by trace $L_D$. At a low priority of P4, the device may be allowed to turn on only at a low actuator speed $N_A$ for a given reference speed, e.g., vehicle speed. However, if the device becomes hot, the same device may be assigned a priority of P1. As illustrated in FIG. 3, the cooling actuator for this device may be allowed to turn on at a much higher speed. In other words, NVH limits related to operation of the cooling actuators at a particular speed are enforced less stringently when cooling priority is highest for a given device. Likewise, when the same device has a low cooling priority, NVH limits for that device are enforced more stringently.

The arbitration module 38 may determine the relative priorities P1-P4 of the various devices at least in part using the NVH limits $L_{A-D}$. The shape and number of the traces 70 in FIG. 4 is merely illustrative. The actual traces 70 could vary in any number of ways to reflect more or fewer priority levels temperatures. Regardless of how the traces 70 are configured, the controller 20, via the device-specific control logic 24, uses the NVH limits L1-L4 of FIG. 3 to determine which of the raw speed requests N1-4 to prioritize relative to the others. That is, the arbitration module 38 assigns a relative priority for each fluid-cooled device, and then uses the assigned relative priorities to determine the required speed of each of the various cooling actuators. The arbitration module 38 processes the raw speed requests N1-N4 and the NVH curve limits L1-L4, via the processor 26 of FIG. 1, and outputs a set of actuator speed requests $N_{40}$ and $N_{42}$ for the fan 40 and pump 42 of FIG. 1, respectively. An additional actuator speed request $N_X$ may be output for an additional actuator, for instance another pump, fan, or blower, if such an actuator is used or is later added. In this manner, the arbitration module 38 automatically arbitrates all cooling requests between the various fluid-cooled devices of the vehicle 10 shown in FIG. 1.

Additionally, the device-specific control logic 24 may be used by the controller 20 of FIG. 1 to implement remedial actions in the thermal system 50 shown in FIG. 2. Such remedial actions may be taken whenever temperature data is not available for one or more fluid-cooled devices. In one possible approach, a calibrated default temperature for a given device and/or default actuator speed may be recorded in memory 22. This recorded default value can be used by the controller 20 in lieu of actual temperature data, with the default value arbitrated via the arbitration module 28 in the same manner as described above. In conventional hybrid thermal systems, a common control response to a faulty sensor is the setting of a cooling actuator to its maximum speed. Priorities are not arbitrated. As a result, such conventional approaches may waste energy while at the same time largely ignoring the NVH effects of a full-on cooling actuator. The present approach can arbitrate default values from some fluid-cooled devices along with cooling requests from the remaining devices.

The temperatures of each fluid-cooled device along with its known performance characteristics may be factors used by the controller 20 in assigning the relative priority to a cooling request from a given fluid-cooled device. Thus, rather than defaulting to a worst-case scenario control mode, e.g., defaulting to maximum possible actuator speed, the arbitration module 38 of FIG. 3 may determine that a different fluid-cooled device has a higher relative priority. In this instance, the controller 20 may set the cooling actuator, e.g., the pump 42, at a speed that is lower than its maximum possible speed, for instance 75% of its maximum. Assumed in this particular example is knowledge that a speed of 75% of maximum still sufficiently cools the devices in a given thermal loop. Such knowledge thus informs any calibration values used for setting the priorities P1-P4 that are shown in FIG. 4.

Figure 5:
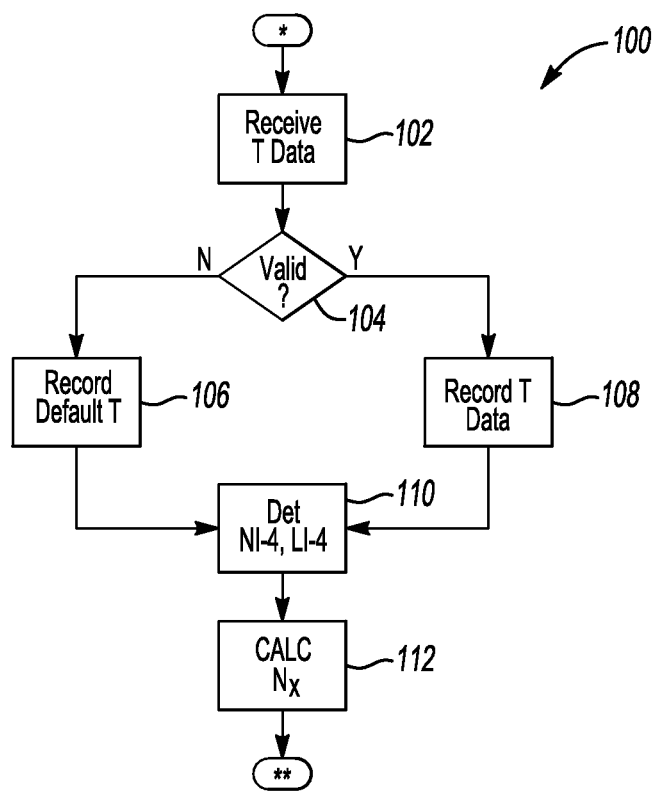
FIG. 5 is a flow chart describing an example method for controlling a hybrid thermal system using the device-specific control logic depicted in FIG. 3.

Referring to FIG. 5, an example method 100 is shown for controlling the thermal system 50 of FIG. 2 using the device-specific control logic 24 shown in FIG. 4. Upon initialization (*), the method 100 commences at step 102, wherein the controller 20 of FIG. 1 receives and records any available temperature data. Step 102 may entail measuring the inlet temperatures T1, T3, and T5 via the temperature sensors S1, S3, S5, S7 of FIG. 2, measuring the internal temperatures T2, T4, T6, T8 via the temperature sensors S2, S4, S6, S8, and/or deriving any of these values. The method 100 then proceeds to step 104.

At step 104, the controller 20 determines whether the temperature data from step 102 is valid, for instance by comparing the received/derived temperature values to a corresponding calibrated reference value. Each sensor has a known maximum and minimum output value. Thus, if the values from step 102 fall outside of this range, the controller 20 can treat the data as being faulty or invalid. As part of step 104, the controller 20 may wait until all signals are deemed invalid. The method 100 proceeds to step 106 when the temperature data is invalid. However, if the data from step 102 is valid, the controller 20 proceeds instead to step 108.

At step 106, the controller 20, having determined at step 104 that the received temperature data from step 102 is invalid, may record a default temperature value. The actual recorded value may vary with the design. In some embodiments, step 106 may entail recording a maximum possible/worst case temperature. In other embodiments, step 106 may entail recording a lower value, which may be an average value or last known valid value. The method 100 then proceeds to step 110.

At step 108, the controller 20, having determined at step 104 that the received temperature data from step 102 is valid, records the temperature value(s) for each component. The method 100 then proceeds to step 110.

At step 110, the controller 20, via the component control modules 60A-60D of FIG. 3, determines the raw speed requests N1-N4 and the NVH limits L1-L4 for the components, and transmits these values to the arbitration module 38. The raw speed requests N1-N4 may be determined in various ways. For example, temperature information may be used, either measured or calculated/derived, with a corresponding speed request determined by the controller 20 as a function of the temperature information. Various temperature sensors are shown in FIG. 2 and described above. A typical speed request in an example of a 3-speed fan is off, low, medium, or high. Thus, step 110 may entail determining which of a set of discrete speed settings are requested or otherwise warranted. Once complete, the method 100 proceeds to step 112.

At step 112, the arbitration module 38 of FIG. 3 arbitrates between the various fluid-cooled devices, ultimately calculating speed requests for each of the cooling actuators, e.g., the fan 40 and/or the pump 42 of FIG. 2. As part of step 112, the arbitration module 38 transmits the speed requests to the respective actuators. The method 100 is finished (**) once step 112 is complete.

Use of the present method 100 as explained above replaces loop-based control with device-specific control, and thus allows cooling actuators to be paired with components that share a cooling loop, e.g., the first and second thermal loops 12A and 12C, respectively. The controller 20 then assigns relative priorities to the various device in the thermal loops 12A and 12C. Thus, a device with an urgent need for cooling is prioritized over other devices which may require more cooling in an absolute sense, but less urgently given the recorded priorities and known NVH limits.

The control approach set forth above also simplifies coding relative to loop-based control, a conventional approach that requires recoding of all control logic for every added or subtracted device in a given thermal loop. The present invention is thus "modular" in that the arbitration module 38, once programmed into memory 22, receives and processes any raw speed requests and NVH curve limits from any additional control modules 60, automatically without recoding of the controller 20, whenever new devices are added to the thermal system 50 of FIG. 2. Likewise, removal of a device from a thermal loop merely requires deletion of its corresponding control module 60, without any other required changes in the structure or operation of the controller 20.

While the best modes for carrying out the invention have been described in detail, those familiar with the art to which this invention relates will recognize various alternative designs and embodiments for practicing the invention within the scope of the appended claims.

The invention claimed is:
1. A hybrid thermal system comprising:
a plurality of fluid-cooled devices;
a thermal loop having:
  a cooling actuator configured to circulate a cooling fluid to the fluid-cooled devices; and
  a fluid passage that connects the cooling actuator to the fluid-cooled devices, and that conducts the cooling fluid to and from the fluid-cooled devices; and
a controller in communication with the fluid-cooled devices and with the cooling actuator, and having a processor and tangible, non-transitory memory on which is recorded device-specific control logic for arbitrating between cooling requests from each of the fluid-cooled devices;
wherein the controller is configured to execute the control logic via the processor to arbitrate between respective cooling requests of the plurality of fluid-cooled devices, and to thereby cause the controller to:
receive, for each of the plurality of fluid-cooled devices, a raw speed request and a corresponding calibrated set of noise, vibration, and harshness (NVH) limits that relates a speed of the cooling actuator to a speed of the vehicle for a plurality of different temperatures;
process the raw speed requests and the set of calibrated NVH limits, including assigning a relative cooling priority to each of the plurality of fluid-cooled devices; and output a speed command to the cooling actuator to thereby cool the fluid-cooled devices at a level required by the fluid-cooled device having the highest assigned relative cooling priority.

2. The hybrid thermal system of claim 1, wherein the plurality of fluid-cooled devices includes at least a power inverter module and a rechargeable energy storage system.

3. The hybrid thermal system of claim 1, wherein the plurality of fluid-cooled devices includes an auxiliary power module.

4. The hybrid thermal system of claim 1, wherein the thermal loop includes a first thermal loop conducting coolant and a second thermal loop conducting air, and wherein the cooling actuator for the first and second thermal loops includes a pump and a fan, respectively.

5. The hybrid thermal system of claim 1, further comprising at least one temperature sensor that measures one of an inlet temperature into and an internal temperature of a corresponding one of the fluid-cooled devices, wherein the controller is configured to determine the NVH limits using the measured inlet or internal temperature.

6. The hybrid thermal system of claim 5, wherein the controller is further programmed with a calibrated default temperature and to use the calibrated default temperature for a corresponding one of the plurality of fluid-cooled devices to determine the speed request for the corresponding one of the plurality of fluid-cooled devices when the at least one temperature sensor for the corresponding fluid-cooled device is faulty.

7. The hybrid thermal system of claim 1, wherein the controller includes:
a plurality of recorded software control modules, each corresponding to a different one of the plurality of fluid-cooled devices, wherein each software control module includes a portion of the recorded device-specific control logic that is executed by the processor to generate the raw speed request and the NVH limits for the corresponding fluid-cooled device; and
an arbitration module in communication with each of the plurality of recorded software control modules;
wherein the arbitration module includes another portion of the recorded device-specific control logic that is executed by the processor to generate the output speed command for each of the cooling actuators used by the hybrid thermal system.

8. A method comprising:
circulating a cooling fluid through a fluid passage to at least one fluid-cooled device in each of a first and a second thermal loop via a first and second cooling actuator, respectively; and
arbitrating, via a controller, cooling requests from each of the fluid-cooled devices, including:
receiving, for each of the fluid-cooled devices, a raw speed request and a noise, vibration, and harshness (NVH) limits that relates a speed of a respective one of the first and second cooling actuators to a reference speed for a plurality of different temperatures;
processing the raw speed requests and the calibrated set of NVH limits, including assigning a relative cooling priority to each of the at least one fluid-cooled devices; and
transmitting a speed command to each of the first and second cooling actuators to thereby cool the at least one fluid-cooled devices in each of the first and second thermal loops at a level required by the fluid-cooled device having the highest relative cooling priority in that particular thermal loop.

9. The method of claim 8, wherein circulating a cooling fluid through a fluid passage includes circulating coolant to at least one fluid-cooled device in the first thermal loop via a fluid pump, and wherein the first cooling actuator is the fluid pump.

10. The method of claim 9, wherein the at least one fluid-cooled device includes a traction power inverter module, a rechargeable energy storage system, and an onboard battery charging module.

11. The method of claim 8, wherein circulating a cooling fluid through a fluid passage includes circulating air to at least one fluid-cooled device in the second thermal loop via a fan, and wherein the second cooling actuator is the fan.

12. The method of claim 11, wherein the at least one fluid-cooled device includes an auxiliary power module.

13. The method of claim 8, further comprising:
receiving temperature signals from at least one temperature sensor that is positioned to measure one of an inlet temperature into and an internal temperature of a corresponding one of the fluid-cooled devices; and
determining, via the controller, the NVH limits using the measured inlet or internal temperature.

14. The method of claim 8, further comprising:
recording a default cooling request for each fluid-cooled device in memory of the controller; and
executing a remedial action using the default cooling request when the at least one temperature sensor for the corresponding fluid-cooled device is faulty.

15. A vehicle comprising:
an electric traction motor having an output member;
a transmission having an input member that is selectively connected to the output member of the electric traction motor;
a plurality of fluid-cooled devices each in electrical communication with the electric traction motor;
a first thermal loop having:
a pump configured to circulate coolant; and
conduit connecting the pump to the fluid-cooled devices cooled via the first thermal loop, and conducting the coolant to and from the fluid-cooled devices in the first thermal loop;
a second thermal loop separate from the first thermal loop and having:
a fan configured to circulate air; and
air ducts connecting the fan to the fluid-cooled devices that are cooled via the second thermal loop, and conducting the air to and from the fluid-cooled devices in the second thermal loop; and
a controller in communication with the fluid-cooled devices of the first and second thermal loops, the pump, and the fan, and having a processor and tangible, non-transitory memory on which is recorded device-specific control logic for arbitrating between cooling requests from each of the fluid-cooled devices;
wherein the controller is configured to execute the device-specific control logic via the processor to thereby cause the processor to:
receive, for each of the fluid-cooled devices, a raw speed request and a set of calibrated noise, vibration, and harshness (NVH) limits that relates a speed of a respective one of the pump and the fan to a speed of the vehicle for a plurality of different temperatures;
process the raw speed requests and the calibrated set of NVH limits, including assigning a relative cooling priority to each of the plurality of fluid-cooled devices; and
output a speed command to the pump and to the fan to thereby cool the plurality of fluid-cooled devices at a level required by the fluid-cooled device having the highest relative cooling priority for that particular thermal loop.

16. The vehicle of claim 15, wherein the plurality of fluid-cooled devices in the first thermal loop includes a power inverter module and a rechargeable energy storage system, and wherein the plurality of fluid-cooled devices in the second thermal loop includes an auxiliary power module.

17. The vehicle of claim 15, further comprising at least one temperature sensor positioned and configured to measure one of an inlet temperature into and an internal temperature of a corresponding one of the fluid-cooled devices, wherein the sensor is in communication with the controller and the controller is configured to determine the NVH limits using the measured inlet or internal temperature.

18. The vehicle of claim 15, wherein the controller is further configured to record a default cooling request, as a remedial action, for a corresponding one of the plurality of fluid-cooled devices when the at least one temperature sensor for the corresponding fluid-cooled device is faulty.

19. The hybrid thermal system of claim 5, wherein the at least one temperature sensor includes a temperature sensor that measures the internal temperature of a corresponding one of the plurality of fluid-cooled devices.

20. The method of claim 13, wherein the at least one temperature sensor includes a temperature sensor positioned to measure the internal temperature of a corresponding one of the fluid-cooled devices, the method comprising determining, via the controller, which of the NVH limits to use via the measured internal temperature.

* * * * *